United States Patent
Barker et al.

(10) Patent No.: US 9,917,307 B2
(45) Date of Patent: Mar. 13, 2018

(54) DOPED NICKELATE COMPOUNDS

(71) Applicant: FARADION LTD, Sheffield (GB)

(72) Inventors: Jeremy Barker, Chipping Norton (GB); Richard Heap, Oxford (GB)

(73) Assignee: FARADION LTD, Sheffeld (GB)

( * ) Notice: Subject to any disclaimer, the term of this patent is extended or adjusted under 35 U.S.C. 154(b) by 0 days.

(21) Appl. No.: 14/430,000

(22) PCT Filed: Oct. 8, 2013

(86) PCT No.: PCT/GB2013/052620
§ 371 (c)(1),
(2) Date: Mar. 20, 2015

(87) PCT Pub. No.: WO2014/057258
PCT Pub. Date: Apr. 17, 2014

(65) Prior Publication Data
US 2015/0243983 A1    Aug. 27, 2015

(30) Foreign Application Priority Data
Oct. 9, 2012 (GB) .................................. 1218047.7

(51) Int. Cl.
*H01M 10/052* (2010.01)
*H01M 4/525* (2010.01)
(Continued)

(52) U.S. Cl.
CPC ............ *H01M 4/525* (2013.01); *C01G 53/40* (2013.01); *C01G 53/50* (2013.01); *C01G 53/66* (2013.01);
(Continued)

(58) Field of Classification Search
CPC .............................. H01M 4/525; H01M 4/505
See application file for complete search history.

(56) References Cited

U.S. PATENT DOCUMENTS

| | | | |
|---|---|---|---|
| 4,246,253 A | 1/1981 | Hunter | |
| 5,135,732 A | 8/1992 | Barboux et al. | |

(Continued)

FOREIGN PATENT DOCUMENTS

| | | |
|---|---|---|
| CN | 1389941 A | 1/2003 |
| CN | 1225045 C | 10/2005 |

(Continued)

OTHER PUBLICATIONS

Lavela (Journal of Power Sources 84 (1999) 75-79)).*
(Continued)

*Primary Examiner* — Olatunji Godo
(74) *Attorney, Agent, or Firm* — Meunier Carlin & Curfman LLC

(57) ABSTRACT

The invention relates to novel electrodes containing one or more active materials comprising: $A_aM^1_vM^2_wM^3_xM^4_yM^5_zO_{2-c}$ (Formula 1) wherein A comprises either sodium or a mixed alkali metal in which sodium is the constituent; $M^1$ is nickel in oxidation state less than or equal to 4+, $M^2$ comprises a metal in oxidation state less than or equal to 4+, $M^3$ comprises a metal in oxidation state 2+, $M^4$ comprises a metal in oxidation state less than or equal to 4+, and $M^5$ comprises a metal in oxidation state 3+ wherein $0 \leq a \leq 1$ $v>0$ at least one of w and y is $>0$ $x \geq 0$ $z \geq 0$ $c>0.1$ where (a, v, w, x, y, z and c) are chosen to maintain electroneutrality. Such materials are useful, for example, as electrode materials in sodium-ion battery applications.

$$A_aM^1_vM^2_wM^3_xM^4_yM^5_zO_{2-c} \quad \text{(Formula 1)}$$

23 Claims, 6 Drawing Sheets

(51) Int. Cl.
    C01G 53/00    (2006.01)
    H01M 4/131    (2010.01)
    H01M 4/505    (2010.01)
    H01M 10/054   (2010.01)
    H01M 4/36     (2006.01)
    H01M 4/02     (2006.01)

(52) U.S. Cl.
    CPC ............ *H01M 4/131* (2013.01); *H01M 4/36* (2013.01); *H01M 4/505* (2013.01); *H01M 10/054* (2013.01); *C01P 2002/50* (2013.01); *C01P 2002/72* (2013.01); *C01P 2006/40* (2013.01); *H01M 2004/028* (2013.01); *Y10T 29/49108* (2015.01)

(56) References Cited

U.S. PATENT DOCUMENTS

| | | | |
|---|---|---|---|
| 6,203,946 | B1 | 3/2001 | Barker et al. |
| 6,387,568 | B1 | 5/2002 | Barker et al. |
| 2002/0142225 | A1 | 10/2002 | Kweon et al. |
| 2002/0192148 | A1 | 12/2002 | Kweon et al. |
| 2003/0003361 | A1* | 1/2003 | Sunagawa ............. C01G 45/00 429/224 |
| 2003/0180616 | A1 | 9/2003 | Johnson et al. |
| 2005/0008563 | A1 | 1/2005 | Naruoka |
| 2005/0130042 | A1 | 6/2005 | Liu et al. |
| 2005/0202316 | A1 | 9/2005 | Hwang et al. |
| 2006/0194114 | A1* | 8/2006 | Saito ..................... H01M 4/131 429/232 |
| 2007/0218361 | A1 | 9/2007 | Inoue et al. |
| 2007/0224506 | A1 | 9/2007 | Ooyama et al. |
| 2009/0087740 | A1* | 4/2009 | Deguchi ............... H01M 4/525 429/200 |
| 2009/0159838 | A1* | 6/2009 | Okada .................. C01G 53/006 252/182.1 |
| 2009/0290287 | A1 | 11/2009 | Lipka et al. |
| 2010/0173202 | A1* | 7/2010 | Saito ..................... C01G 51/50 429/224 |
| 2010/0323232 | A1 | 12/2010 | Kuze et al. |
| 2012/0028128 | A1 | 2/2012 | Seino et al. |
| 2012/0070743 | A1 | 3/2012 | Kwon et al. |
| 2012/0164533 | A1* | 6/2012 | Senoue ................. H01M 4/485 429/219 |
| 2012/0183837 | A1 | 7/2012 | Johnson et al. |
| 2012/0292561 | A1 | 11/2012 | Sasaoka et al. |
| 2012/0315530 | A1 | 12/2012 | Kageura |

FOREIGN PATENT DOCUMENTS

| | | |
|---|---|---|
| CN | 100521359 C | 7/2009 |
| CN | 102341941 A | 2/2012 |
| EP | 1130665 A1 | 9/2001 |
| EP | 2211405 A1 | 7/2010 |
| EP | 2323204 A1 | 5/2011 |
| EP | 2416411 A1 | 2/2012 |
| EP | 2541651 A1 | 1/2013 |
| JP | 2004002141 | 1/2004 |
| JP | 2005353330 | 12/2015 |
| WO | 2010107084 A1 | 9/2010 |
| WO | 2011089958 A1 | 7/2011 |
| WO | 2011102497 A1 | 8/2011 |
| WO | 2002097907 A2 | 12/2012 |
| WO | 2013140174 A2 | 9/2013 |

OTHER PUBLICATIONS

Kim et al. (Adv. Energy Mater. 2011, 1, 333-336).*
Komaba et al. (Inorg. Chem. 2012, 51, 6211-6220).*
Search Report issued by the State Intellectual Property Office of the People's Republic of China, in connection with Chinese Patent Application No. 2013800363719, dated Sep. 22, 2015.
Search Report issued by the State Intellectual Property Office of the People's Republic of China, in connection with Chinese Patent Application No. 2013800363390, dated Sep. 14, 2015.
Search Report issued by the State Intellectual Property Office of the People's Republic of China, in connection with Chinese Patent Application No. 2013800363653, dated Aug. 25, 2015.
Communication pursuant to Article 94(3) EPC issued by the European Patent Office on Feb. 22, 2016, in connection with European Application No. 13789884.7.
Second Office Action issued by the Chinese Patent Office dated Mar. 18, 2016, in connection with Chinese Application No. 201380036339.0
Search Report issued in connection with Chinese Patent Application No. 201380036360.0, dated Aug. 5, 2015.
First Office Action issued in connection with Chinese Patent Application No. 201380036360.0, dated Aug. 20, 2015.
Komaba, et al., "Electrochemical Na Insertion and Solid Electrolyte Interphase for Hard-Carbon Electrodes and Application to Na-Ion Batteries," Advanced Functional Materials, 2011, vol. 21, pp. 3859-3867.
Padhi, et al., "Phospho-olivines as Positive-Electrode Materials for Rechargeable Lithium Batteries," Journal of Electrochemical Society, Apr. 1997, vol. 144, No. 4, pp. 1188-1194.
Toprakci, et al., "Fabrication and Electrochemical Characteristics of $LiFePO_4$ Powders for Lithium-Ion Batteries," KONA Powder and Particle Journal, 2010, No. 28, pp. 50-73.
Great Britain Intellectual Property Office Search Report for Great Britain Patent Application No. GB1212261.0, dated Oct. 23, 2012.
International Search Report and Written Opinion, dated Oct. 9, 2013, in International Application No. PCT/GB2013/051822.
International Preliminary Report on Patentability, dated Jun. 16, 2014, in International Application No. PCT/GB2013/051822.
Response to International Search Report and Written Opinion, dated Dec. 4, 2013, in International Application No. PCT/GB2013/051822.
International Search Report and Written Opinion, dated Oct. 9, 2013, in International Application No. PCT/GB2013/051821.
International Preliminary Report on Patentability, dated Jun. 16, 2014, in International Application No. PCT/GB2013/051821.
Response to International Search Report and Written Opinion, dated Dec. 4, 2013, in International Application No. PCT/GB2013/051821.
Great Britain Intellectual Property Office Search Report for Great Britain Patent Application No. GB1212263.6, dated Oct. 30, 2012.
International Search Report and Written Opinion, dated Oct. 9, 2013, in International Application No. PCT/GB2013/051824.
Response to International Search Report and Written Opinion, dated Dec. 4, 2013, in International Application No. PCT/GB2013/051824.
International Preliminary Report on Patentability, dated Jun. 16, 2014, in International Application No. PCT/GB2013/051824.
Kim, J.-H., et al., "Electrochemical performance of $Li[Li_xNi_{(1-3x)/2}Mn_{(1+x)/2}]O_2$ cathode materials synthesized by a sol-gel method," Journal of Power Sources, Elsevier Science B.V., vol. 119-121, 2003, pp. 166-170.
Great Britain Intellectual Property Office Search Report for Great Britain Patent Application No. GB1212268.5, dated Oct. 23, 2012.
International Search Report and Written Opinion, dated Oct. 9, 2013, in International Application No. PCT/GB2013/051808.
International Preliminary Report on Patentability, dated Jun. 20, 2014, and Applicant's Demand Under PCT Article 31, dated Mar. 11, 2014, in International Application No. PCT/GB2013/051808.
Response to International Search Report and Written Opinion pursuant to PCT Article 19, dated Dec. 4, 2013, in International Application No. PCT/GB2013/051808.
Kim, D., et al., "Enabling Sodium Batteries Using Lithium-Substituted Sodium Layered Transition Metal Oxide Cathodes," Advanced Energy Materials, vol. 1, 2011, pp. 333-336.
Antolini, Ermete, "The Stability of Molten Carbonate Fuel Cell Electrodes: A Review of Recent Improvements," Applied Energy, 2011, vol. 88, pp. 4274-4293.
Great Britain Intellectual Property Office Search Report for Great Britain Patent Application No. GB1218047.7, dated Feb. 19, 2013.

(56) References Cited

OTHER PUBLICATIONS

Great Britain Intellectual Property Office Further Search Report for Great Britain Patent Application No. GB1218047.7, dated Nov. 11, 2013.
International Search Report and Written Opinion, dated Feb. 27, 2014, in International Application No. PCT/GB2013/052620.
International Preliminary Report on Patentability, dated Nov. 26, 2014, and Applicant's Demand Under PCT Article 31, dated Jun. 27, 2014, in International Application No. PCT/GB2013/052620.
Kim et al., Structural and Electrochemical Investigation of Na+ Insertion into High-Voltage Spinel Electrodes, Chemistry of Materials, vol. 27, p. 2546-2556, 2015.
Kim et al., NaMn2-xNixO4 Derived from Mesoporous LiMn2-xNixO4: High-Voltage Spinel Cathode Materials for Na-Ion Batteries, Journal of the Electrochemical Society, 163(5) A696-A705, 2016.
Komaba et al., Electrochemical intercalation activity of layered NaCrO2 vs. LiCrO2, Electrochemistry Communications, vol. 12, Issue 3, p. 355-358, 2010 (Abstract).
Liu et al., High stable post-spinel NaMn2O4 cathode of sodium ion battery, Journal of Materials Chemistry A, 14822-14826, 2014.
Ong et al., Voltage, stability and diffusion barrier differences between sodium-ion and lithium-ion intercalation materials, Energy Environ. Sci., 2011.
Shakoor et al., Synthesis of NaFePO4/NaCoPO4 and their application to Sodium Batteries, Journal of Korean Battery Society (KAIST), vol. 3, No. 2, 2010.
Final Office Action issued in co-pending U.S. Appl. No. 14/413,828, dated Feb. 9, 2017.
Non-Final Office Action issued in co-pending U.S. Appl. No. 14/413,824, dated Jul. 8, 2016.
Non-Final Office Action issued in co-pending U.S. Appl. No. 14/413,828, dated Jul. 8, 2016.
Non Final Office Action issued in co-pending U.S. Appl. No. 14/413,827, dated Apr. 27, 2017.
Final Office Action issued in co-pending U.S. Appl. No. 14/413,824, dated Mar. 6, 2017.
Office Action issued in corresponding JP Application 2015-535116, dated Aug. 15, 2017, and the English Translation thereof.

* cited by examiner

DOPED NICKELATE COMPOUNDS

FIELD OF THE INVENTION

The present invention relates to novel doped nickelate-containing compositions and their method of preparation, to electrodes containing the novel doped nickelate-containing compositions, and to the use of these electrodes, for example in energy storage devices.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications.

By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality. $NaNi_{0.5}Mn_{0.5}O_2$ is a known Na-ion material in which the nickel is present as $Ni^{2+}$ while the manganese is present as $Mn^{4+}$. The material is ordered with the Na and Ni atoms residing in discrete sites within the structure. The nickel ions ($Ni^{2+}$) are a redox element which contributes to the reversible specific capacity and the manganese ions ($Mn^{4+}$) play the role of a structure stabilizer. Compound $NaNi_{0.5}Ti_{0.5}O_2$ is analogous to $NaNi_{0.5}Mn_{0.5}O_2$ in that the $Ni^{2+}$ ions provide the active redox centre and the $Ti^{4+}$ ions are present for structure stabilization. There is plenty of literature describing the preparation of $NaNi_{0.5}Mn_{0.5}O_2$ (and to a lesser extent $NaNi_{0.5}Ti_{0.5}O_2$) as the precursor for making $LiNi_{0.5}Mn_{0.5}O_2$ and $LiNi_{0.5}Ti_{0.5}O_2$ by Na→Li ion exchange for Li-ion applications. A direct synthesis method to make these Li materials yields undesirable disordered materials, for example, as a result of the lithium and nickel atoms sharing structural sites. However, recent electrochemical studies reported by Komaba et al Adv. Funct. Mater. 2011, 21, 3859 describe the sodium insertion performance of hard-carbon and layered $NaNi_{0.5}Mn_{0.5}O_2$ electrodes in propylene carbonate electrolyte solutions. The results obtained show that although $NaNi_{0.5}Mn_{0.5}O_2$ exhibits some reversible charging and discharging ability, the capacity of the material fades by 25% or more, after only 40 cycles.

It is typically possible to predict the maximum charge capacity for sodium and lithium nickelate compounds based on the $Ni^{2+}$ to $Ni^{4+}$ redox process, however as Zhonghua Lu and J. R. Dahn, J. Electrochemical Society, 149 (7) A815-A822 (2002) explain, the electrochemical behaviour of cells made using lithium containing compounds, e.g. $Li[Ni_xLi_{(1/3-2x/3)}Mn_{(2/3-x/3)}]O_2$, where $x=\frac{1}{6}$, $\frac{1}{4}$, $\frac{1}{3}$ and $\frac{5}{12}$ do not always follow this conventional wisdom. These workers report that when cells containing lithium-nickelate materials are charged at voltages up to 4.45V, this causes lithium to be removed until the Mn oxidation state reaches 4+; thus giving an expected charge capacity of 2x. However, when lithium cells where $x<\frac{1}{2}$ are charged to higher voltages, e.g. between 4.5 and 4.7V, they exhibit a long plateau approximately corresponding to 1-2x and subsequent to this plateau, these materials reversibly cycle at capacities over 225 mAh/g. Put simply, lithium-containing compounds of the formula $Li[Ni_xLi_{(1/3-2x/3)}Mn_{(2/3-x/3)}]O_2$ where the amount of nickel is less than 0.5, exhibit a significantly higher charge capacity than would be expected from conventional theoretical calculation. By contrast, Lu and Dahn note that a similar increase in charge capacity is not observed when x=0.5, i.e. $LiNi_{0.5}Mn_{0.5}O_2$, as there is sufficient nickel present to remove all of the lithium. To explain the higher than expected charge capacity phenomenon, Lu and Dahn demonstrated that their lithium materials undergo a non-reversible loss of oxygen when they are charged to higher voltages, and these oxygen deficient materials then react reversibly with lithium. Notwithstanding this, although this increased charge capacity is a potentially interesting discovery, the commercial utility of such compounds is hindered by the high cost of lithium, as discussed above.

US2007/0218361 teaches a sodium ion secondary battery which comprises a positive electrode active material which includes a sodium-containing transition metal oxide $Na_aLi_bM_xO_{2\pm\alpha}$. The M includes at least two of manganese, iron, cobalt and nickel. In such materials it is apparently extremely important that the amount of sodium is neither too large (otherwise excess sodium oxide or sodium hydride is produced which causes the positive electrode to become highly moisture absorptive) nor too small. In the latter case the amount of sodium ions that can be intercalated and de-intercalated is said to be reduced and this results in a high discharge capacity not being able to be obtained. This prior art describes that the optimum amount of sodium, i.e. the value of a, is preferably 0.6 to 1.1, further preferably 0.9 to 1.1 and more preferably 1. Meanwhile the amount of oxygen is also described as critical to performance. Too much oxygen is said to occupy transition metal and/or alkaline metal sites, and presumably this will hinder re-intercalation of the sodium ions during charge/discharge. Too little oxygen is said to produce material with a crystal structure with lots of defects. The optimum range for a is from 0 to 0.1. Another feature of the specific examples described in US2007/0218361 is that they all contain manganese in oxidation state +3. This is to allow sodium extraction by a manganese oxidation process ($Mn^{+3} \rightarrow Mn^{4+}$).

The present invention aims to provide a cost effective electrode that contains an active material that is capable of achieving a considerably higher specific charge capacity than would be expected from conventional theoretical calculations. Further, it is desirable for such active materials to be straightforward to manufacture and easy to handle and store. Further still, the present invention aims to provide an electrode which is able to be recharged multiple times without significant loss in charge capacity. In particular the present invention will provide an energy storage device that utilises an electrode of the present invention for use in a sodium-ion cell or a sodium metal cell.

Therefore in a first aspect, the present invention provides an electrode containing one or more active materials comprising:

$$A_aM^1_VM^2_WM^3_XM^4_YM^5_ZO_{2-c} \quad \text{(Formula 1)}$$

wherein
A comprises either sodium or a mixed alkali metal in which sodium is the major constituent;
$M^1$ is nickel in oxidation state less than or equal to 4+,
$M^2$ comprises a metal in oxidation state less than or equal to 4+,
$M^3$ comprises a metal in oxidation state 2+,
$M^4$ comprises a metal in oxidation state less than or equal to 4+, and
$M^5$ comprises a metal in oxidation state 3+
wherein
$0 \leq a \leq 1$, preferably $0 \leq a < 0.5$
$v > 0$, preferably $0 < v < 0.5$
at least one of w and y is $>0$
$x \geq 0$, preferably $x > 0$
$z \geq 0$
$c > 0.1$, preferably $0.1 < c \leq 0.5$
where (a, v, w, x, y, z and c) are chosen to maintain electroneutrality.

Preferred electrodes of the present invention contain one or more active materials comprising:

$$A_aM^1_VM^2_WM^3_XM^4_YM^5_ZO_{2-c} \quad \text{(Formula 1)}$$

wherein
A comprises either sodium or a mixed alkali metal in which sodium is the major constituent;
$M^1$ is nickel in oxidation state 4+,
$M^2$ comprises a metal in oxidation state 4+,
$M^3$ comprises a metal in oxidation state 2+,
$M^4$ comprises a metal in oxidation state 4+, and
$M^5$ comprises a metal in oxidation state 3+
wherein
$0 \leq a < 1$, preferably $0 \leq a < 0.5$
$v > 0$, preferably $0 < v < 0.5$
at least one of w and y is $>0$
$x \geq 0$, preferably $x > 0$
$z \geq 0$
$c > 0.1$, preferably $0.1 < c \leq 0.5$
where (a, v, w, x, y, z and c) are chosen to maintain electroneutrality.

Particularly preferred electrodes contain one or more active materials comprising:

$$A_aM^1_VM^2_WM^3_XM^4_YM^5_ZO_{2-c} \quad \text{(Formula 1)}$$

wherein
A comprises either sodium or a mixed alkali metal in which sodium is the major constituent;
$M^1$ is nickel in oxidation state less than 4+,
$M^2$ comprises a metal in oxidation state less than or equal to 4+,
$M^3$ comprises a metal in oxidation state 2+,
$M^4$ comprises a metal in oxidation state less than or equal to 4+, and
$M^5$ comprises a metal in oxidation state 3+
wherein
$0 \leq a \leq 1$, preferably $0 \leq a < 0.5$
$v > 0$, preferably $0 < v < 0.5$
at least one of w and y is $>0$
$x \geq 0$, preferably $x > 0$
$z \geq 0$
$c > 0.1$, preferably $0.1 < c \leq 0.5$ where (a, v, w, x, y, z and c) are chosen to maintain electroneutrality.

Metals $M^2$ and $M^4$ may be the same or a different metal in oxidation state less than or equal to 4+. Moreover $M^2$ and $M^4$ are interchangeable with each other. When $M_2=M^4$ then Formula 1 may be written either as:

$$A_aM^1_VM^2_WM^3_XM^4_YM^5_ZO_{2-c},$$

or $$A_aM^1_VM^2_{W+Y}M^3_XM^5_ZO_{2-c},$$

or $$A_aM^1_VM^3_XM^4_{Y+W}M^5_ZO_{2-c},$$

and all of these forms of the equation are to be regarded as equivalent.

Compounds having sodium alone as the chosen alkali metal are especially preferred.

Preferably, $M^2$ comprises a metal selected from one or more of manganese, titanium and zirconium; $M^3$ comprises a metal selected from one or more of magnesium, calcium, copper, zinc and cobalt; $M^4$ comprises a metal selected from one or more of manganese, titanium and zirconium; and $M^5$ comprises a metal selected from one or more of aluminium, iron, cobalt, molybdenum, chromium, vanadium, scandium and yttrium.

As discussed below, the active materials of Formula 1 are surprisingly capable of providing a specific charge capacity that is considerably higher than that predicted from conventional theoretical calculations.

Especially preferred electrodes contain one or more active materials comprising:

$$A_aM^1_VM^2_WM^3_XM^4_YM^5_ZO_{2-c} \quad \text{(Formula 1)}$$

wherein
$0 \leq a \leq 1$; preferably $0 \leq a < 0.5$; further preferably $0 \leq a \leq 0.4$; and highly preferably $0.1 \leq a \leq 0.4$;
$v > 0$, preferably $0 < v < 0.5$;
$0 < w \leq 0.5$;
$0 \leq x < 0.5$; preferably $0 < x < 0.5$;
$0 < y < 0.5$;
$z \geq 0$; and
$c \geq 0.11$; preferably $c \geq 0.13$ and highly preferably $c \geq 0.15$, preferably the upper limit for c is $\leq 0.5$,
where a, v, w, x, y, z and c are chosen to maintain electroneutrality.

In a highly preferred active material of the present invention, $(v+w) < 0.8$, especially when $M^2$=Mn and/or Ti.

Advantageous electrodes of the present invention contain one or more active materials comprising:
$Ni_{0.25}Ti_{0.25}Mg_{0.25}Mn_{0.25}O_{1.75}$;
$Ni_{0.33}Mn_{0.33}Mg_{0.167}Ti_{0.167}O_{1.83}$;
$Ni_{0.33}Mn_{0.33}Cu_{0.167}Ti_{0.167}O_{1.833}$;
$Ni_{0.33}Mn_{0.33}Zn_{0.167}Ti_{0.167}O_{1.833}$;
$Ni_{0.33}Mn_{0.33}Ca_{0.167}Ti_{0.167}O_{1.833}$;
$Ni_{0.45}Mn_{0.45}Mg_{0.05}Ti_{0.05}O_{1.95}$;
$Ni_{0.35}Mn_{0.35}Mg_{0.15}Ti_{0.15}O_{1.85}$;
$Ni_{0.3}Mn_{0.253}Mg_{0.2}Ti_{0.2}O_{1.8}$;
$Ni_{0.4}Mn_{0.254}Mg_{0.251}Ti_{0.251}O_{1.9}$;
$Ni_{0.4}Mn_{0.4}Mg_{0.05}Ti_{0.05}Al_{0.1}O_{1.9}$;
$Ni_{0.35}Mn_{0.35}Mg_{0.05}Ti_{0.05}Al_{0.2}O_{1.85}$;
$Ni_{0.33}Mn_{0.33}Mg_{0.11}Ti_{0.11}Al_{0.11}O_{1.83}$;
$Ni_{0.3}Mn_{0.3}Mg_{0.05}Ti_{0.05}Al_{0.3}O_{1.8}$;
$Ni_{0.35}Mn_{0.35}Mg_{0.1}Ti_{0.1}Al_{0.1}O_{1.85}$;
$Ni_{0.3}Mn_{0.3}Mg_{0.1}Ti_{0.1}Al_{0.2}O_{1.8}$;
$Ni_{0.33}Mn_{0.33}Al_{0.33}O_{1.83}$;

$Ni_{0.4}Mg_{0.1}Mn_{0.5}O_{1.9}$;
$Ni_{0.35}Mg_{0.15}Mn_{0.5}O_{1.85}$;
$Ni_{0.333}Mg_{0.167}Mn_{0.5}O_{1.833}$;
$Ni_{0.3}Mg_{0.2}Mn_{0.5}O_{1.8}$;
$Ni_{0.4}Mg_{0.1}Mn_{0.5}O_{1.9}$;
$Ni_{0.35}Mg_{0.15}Mn_{0.5}O_{1.85}$;
$Ni_{0.3}Mg_{0.2}Mn_{0.5}O_{1.8}$;
$Na_{0.2}Ni_{0.25}Ti_{0.25}Mg_{0.25}Mn_{0.25}O_{1.85}$;
$Na_{0.2}Ni_{0.333}Mn_{0.333}Mg_{0.167}Ti_{0.167}O_{1.933}$;
$Na_{0.2}Ni_{0.333}Mn_{0.333}Zn_{0.167}Ti_{0.167}O_{1.933}$;
$Na_{0.2}Ni_{0.333}Mn_{0.333}Zn_{0.167}Ti_{0.167}O_{1.933}$;
$Na_{0.2}Ni_{0.333}Mn_{0.333}Ca_{0.167}Ti_{0.167}O_{1.933}$;
$Na_{0.05}Ni_{0.45}Mn_{0.45}Mg_{0.05}Ti_{0.05}O_{1.975}$;
$Na_{0.2}Ni_{0.35}Mn_{0.35}Mg_{0.15}Ti_{0.15}O_{1.95}$;
$Na_{0.2}Ni_{0.3}Mn_{0.3}Mg_{0.2}Ti_{0.2}O_{1.9}$;
$Na_{0.1}Ni_{0.4}Mn_{0.4}Mg_{0.1}Ti_{0.1}O_{1.95}$;
$Na_{0.1}Ni_{0.4}Mn_{0.254}Mg_{0.05}Ti_{0.05}Al_{0.1}O_{1.95}$;
$Na_{0.2}Ni_{0.35}Mn_{0.35}Mg_{0.05}Ti_{0.05}Al_{0.2}O_{1.95}$;
$Na_{0.2}Ni_{0.333}Mn_{0.333}Mg_{0.111}Ti_{0.111}Al_{0.11}O_{1.933}$;
$Na_{0.2}Ni_{0.3}Mn_{0.3}Mg_{0.05}Ti_{0.05}Al_{0.3}O_{1.9}$;
$Na_{0.2}Ni_{0.35}Mn_{0.35}Mg_{0.1}Ti_{0.1}Al_{0.1}O_{1.95}$;
$Na_{0.2}Ni_{0.3}Mn_{0.3}Mg_{0.1}Ti_{0.1}Al_{0.2}O_{1.9}$;
$Na_{0.2}Ni_{0.333}Mn_{0.333}Al_{0.333}O_{1.933}$;
$Na_{0.1}Ni_{0.4}Mg_{0.1}Mn_{0.5}O_{1.95}$;
$Na_{0.2}Ni_{0.35}Mg_{0.15}Mn_{0.5}O_{1.95}$;
$Na_{0.2}Ni_{0.333}Mg_{0.167}Mn_{0.5}O_{1.933}$;
$Na_{0.2}Ni_{0.3}Mg_{0.2}Mn_{0.5}O_{1.9}$;
$Na_{0.2}Ni_{0.3}Mg_{0.2}Mn_{0.5}O_{1.9}$;
$Na_{0.2}Ni_{0.35}Mg_{0.15}Mn_{0.5}O_{1.95}$; and
$Na_{0.2}Ni_{0.3}Mg_{0.2}Mn_{0.5}O_{1.9}$.
with $Ni_{0.33}Mn_{0.33}M^3_{0.167}Ti_{0.167}O_{1.833}$ and $Na_{0.2}Ni_{0.33}Mn_{0.33}M^3_{0.167}Ti_{0.167}O_{1.933}$ being the most favourable materials.

The active materials used in the electrodes of the present invention may be prepared using any known method. However, a particularly convenient method involves effecting the net loss of $Na_2O$ from one or more active cathode materials of Formula 2, where Formula 2 is defined as

  (Formula 2)

wherein
A' comprises either sodium or a mixed alkali metal in which sodium is the major constituent;
$M^{1'}$ is nickel in oxidation state 2+,
$M^{2'}$ comprises a metal in oxidation state 4+,
$M^{3'}$ comprises a metal in oxidation state 2+,
$M^{4'}$ comprises a metal in oxidation state 4+, and
$M^{5'}$ comprises a metal in oxidation state 3+
$1 \leq a' < 2$;
$0 < v' < 0.5$;
$0 < w' \leq 0.5$;
$0 \leq x' < 0.5$;
$0 \leq y' < 0.5$;
$z' \geq 0$;
and wherein v', w', x', y' and z' are all chosen to maintain electroneutrality.

A highly efficient process of producing compositions of Formula 1 comprises:
charging an electrochemical cell containing one or more active cathode materials of Formula 2 beyond the conventional theoretical specific capacity as determined by the $Ni^{2+}/Ni^{4+}$ redox couple; wherein Formula 2 is defined as:

  (Formula 2)

wherein
A' comprises either sodium or a mixed alkali metal in which sodium is the major constituent;
$M^{1'}$ is nickel in oxidation state 2+,
$M^{2'}$ comprises a metal in oxidation state 4+,
$M^{3'}$ comprises a metal in oxidation state 2+,
$M^{4'}$ comprises a metal in oxidation state 4+, and
$M^{5'}$ comprises a metal in oxidation state 3+
$1 \leq a' < 2$;
$0 < v' < 0.5$;
$0 < w' \leq 0.5$;
$0 \leq x' < 0.5$;
$0 \leq y' < 0.5$;
$z' \geq 0$;
and wherein v', w', x', y' and z' are all chosen to maintain electroneutrality.

The compounds of Formula 2 are disclosed in Applicant's patent applications GB1212263.6, GB1212268.5 and GB1212261.0 which documents are incorporated herein by reference.

The process of overcharging involves charging the electrochemical cell containing the one or more active cathode materials to a specific capacity greater than 180 mAh/g. Typically this means charging the Na-ion cell to at least 4.2V. Preferably the overcharging process is the first charge performed on the active materials although it may be possible to charge the active materials to their "normal" specific capacity first and follow this with a process in which the materials are overcharged.

Charging doped sodium nickelate compounds of Formula 2 up to their theoretical capacity causes the oxidation of $Ni^{2+}$ to $Ni^{4+}$ and the removal of a portion of the sodium ions from the lattice. By contrast, charging such compounds above their conventional theoretical capacity, i.e. "over-charging" them, produces materials of Formula 1 in which
$M^1$ is nickel in oxidation state 4+,
$M^2$ comprises a metal in oxidation state 4+,
$M^4$ comprises a metal in oxidation state 4+,
$0 \leq a < 1$, preferably $0 \leq a < 0.5$ and
$C > 0.1$, preferably $0.1 < c \leq 0.5$.

The enhanced charge capacity (or anomalous charge capacity) observed when materials of Formula 2 are "overcharged" is due to several changes that occur as the overcharging is taking place. Broadly speaking this is a combination of the conventional (or "normal") charge process using just the oxidation of $Ni^{2+}$ to $Ni^{4+}$, together with other structural changes that occur exclusively at the higher voltages, such as the removal of a higher than expected (from conventional theory) number of sodium ions and also an irreversible partial loss of oxygen to yield $O_{2-c}$-containing active materials.

The present invention therefore provides a method of increasing the specific charge capacity of an oxide-containing cathode composition for use in a Na-ion cell comprising:
charging the oxide-containing cathode composition in an electrochemical cell to cause the loss of oxygen from the oxide-containing cathode composition and thereby form an oxygen deficient oxide-containing cathode composition.

Further the present invention provides an oxygen deficient oxide-containing cathode composition, for example made using the above method.

Advantageously the present invention provides an electrode comprising an oxygen deficient oxide-containing cathode composition, for example made using the above method.

The mechanism by which oxygen is lost from the active cathode composition during the overcharging process operates most efficiently when the oxide-containing active cathode composition comprises a layered structure. Layered $A_xMO_2$ materials are known to adopt several, very similar structural types, the most well-known of which have been categorised by Delmas et al. *Physica B+C,* 91, (1980), 81, as "03, P2 and P3". These notations describe the stacking of the layers; the letter refers to the way in which the oxygen ions are coordinated to the alkali ions, with the letter 0 denoting an octahedral coordination and the letter P denoting a prismatic coordination. The number refers to the number of $MO_2$ layers contained in the unit cell. In the case of the uncharged active cathode materials used in the electrodes of present invention, it is preferred that they adopt a layered α-$NaFeO_2$ type structure (space group R-3m, no. 166), which has an 03 crystal structure. Following charging, these materials are thought to adopt 03, P2 or P3 or modified versions of these crystal structures, although it is also possible that other crystal structures may be adopted.

The Applicant has noted that when layered active cathode materials, for example of Formula 2, are over-charged in a Na-ion cell, they undergo a structural change, which produces a reduction in the volume of the unit cell as compared with both the pristine precursor material, e.g. materials of Formula 2 before charging, and the precursor material after it has been charged to its conventional theoretical capacity, e.g. based on $Ni^{2+}$ to $Ni^{4+}$. It is believed that such unit cell volume reduction is consistent with the loss of alkali metal-ions and oxygen loss. This is discussed further below in the relation to the Specific Examples. Another characteristic of overcharged oxide-containing cathode compositions is that they appear to lose crystallinity (compared with to the uncharged material); this is shown by the FWHM of the 003 peak of the XRD pattern.

A determination of when a material is said to be "over-charged" is made by observing the voltage curve for the particular material. At capacities less than or close to the conventional theoretical maximum charge capacity (i.e. the $Ni^{2+}/Ni^{4+}$ redox couple) a first voltage feature is seen. However the curve continues to rise to a second voltage feature upon further or "over" charging. The materials are said to be "over-charged" from the beginning of this second voltage feature.

Therefore the present invention provides a method of optimising the specific charge capacity of an oxide-containing cathode composition for use in a sodium-ion cell comprising charging the composition onto at least a portion of a voltage feature which is observed as a result of the oxide-containing cathode composition being charged above the conventional theoretical maximum charge capacity.

The present invention also provides a method of optimising the specific charge capacity of an oxide-containing cathode composition in a sodium-ion cell comprising:

a) charging the sodium-ion cell beyond the conventional theoretical capacity of the cathode based on the $Ni^{2+}/Ni^{4+}$ redox couple; and b) degassing the Na-ion cell to remove gasses formed during the charging process.

A doped sodium nickelate of Formula 2 charged to its theoretical specific capacity limit based on the $Ni^{2+}/Ni^{4+}$ redox couple, will re-yield a compound with no oxygen loss when discharged; i.e. at this level, charging is seen to be reversible. However, discharging compounds of Formula 2 that have been "over-charged" results in producing materials of Formula 1 in which $M^1$ is nickel in oxidation state less than 4+, at least one of $M^2$ and $M^4$ comprises a metal in oxidation state less than 4+, 0<a≤1

0<v<0.5 and c>0.1, preferably 0.1<c<0.5.

Consequently, during the discharge of over-charged compounds of Formula 2 the nickel is reduced from oxidation state 4+ to oxidation state 2+, some or all of the sodium-ions are re-inserted into the lattice and the lost oxygen atoms are not replaced. Moreover, although the metals $M^2$ and/or $M^4$ do not contribute anything to the initial overcharging process, upon discharge of the overcharged material it is found that at least one of the metals $M^2$ and/or $M^4$ is also reduced to an oxidation state less than 4+. This allows some or all of the sodium ions that were removed during the first "over-charge" to be reinserted into the material, and therefore produces a material with a higher discharge capacity. It is clear from this description that the role of the $Mn^{4+}$ (or $Ti^{4+}$) in the uncharged materials of the present invention is to allow for the reduction (Na insertion) process during cell discharge. This is in direct contrast to the role of the manganese in US2007/0218361 which is to allow Na extraction by the Mn oxidation process $Mn^{3+} \rightarrow Mn^{4+}$ during the first charge process.

The role of the $M^3$ and $M^5$ metals is to reduce the amount of nickel in the doped nickelate materials of Formula 1, thereby allowing the "over charge" mechanism to take place as oxygen is released from the structure. The presence of the $M^3$ and $M^5$ metals also reduces the relative formula mass (formula weight) of these materials, thereby further improving the cost effectiveness of the electrode materials. In order to achieve anomalous capacity, there must be over twice the amount of sodium as there is nickel in the pristine materials (e.g. Formula 2) so that, when all $Ni^{2+}$ has oxidised to $Ni^{4+}$, there is still some Na left in the material, which can then be removed when the material is overcharged and releases oxygen. This explains why anomalous capacity is not observed for $NaNi_{0.5}Mn_{0.5}O_2$; in this case there is enough $Ni^{2+}$ present to remove all of the Na. In each of the compounds of Formula 2 where a'=1, following the requirement above, there has to be less than 0.5 Ni and the overall material must be electroneutral. Satisfaction of these two conditions is facilitated by the presence of an $M^3$ metal, and/or an $M^5$ metal.

When oxide-containing cathode compositions have undergone the over-charge/discharge process described, it is found that they may be cycled in the Na-ion cell between normal voltage limits for the $Ni^{2+}/Ni^{4+}$ redox couple, typically this might be expected to be between 1 and 4V, and no further unconventional voltage plateaux are formed. Moreover, cycling the over-charged/discharged compositions at normal voltage limits maintains a higher specific capacity than would be expected from conventional theoretical calculations, i.e. the over-charged/discharged oxide-containing cathode compositions perform better than the pristine compounds when cycled using the same normal voltage limits.

Thus the present invention provides a method of using an oxide-containing cathode composition according to Formula 1 in a Na-ion cell comprising:

a) charging a Na-ion cell comprising an oxide-containing cathode composition according to Formula 2 to a cell voltage beyond the conventional theoretical capacity of the cathode material based on the $Ni^{2+}/Ni^{4+}$ redox couple;

b) degassing the Na-ion cell to remove gasses formed during the charging process; and c) cycling the resulting Na-ion cell, which now comprises an oxide-containing cathode composition according to Formula 1, over a voltage range within the normal voltage limits of the $Ni^{2+}/Ni^{4+}$ redox couple.

As mentioned above, it is envisaged that the optimized oxide-containing cathode composition of the present invention may be prepared by a method that does not rely on overcharging a compound of Formula 2. Thus the present invention includes an optimised oxide-containing cathode composition made by any route.

The electrodes according to the present invention are suitable for use in many different applications, for example energy storage devices, rechargeable batteries, electrochemical devices and electrochromic devices.

Advantageously, the electrodes according to the invention are used in conjunction with a counter electrode and one or more electrolyte materials. The electrolyte materials may be any conventional or known materials and may comprise either aqueous electrolyte(s) or non-aqueous electrolyte(s).

The present invention also provides an energy storage device that utilises an electrode comprising the active materials described above, and particularly an energy storage device for use as a sodium-ion cell and/or a cell in which sodium is the major mobile ion; a cell in which sodium is the major alkali metal-ion; either of which may be used in a non-aqueous or an aqueous electrolyte system.

It is also possible to convert sodium-ion derivatives into mixed lithium-ion/sodium-ion materials using an ion exchange process.

Typical ways to achieve Na to Li-ion exchange include:
1. Mixing the sodium-ion material with a lithium-containing material e.g. $LiNO_3$, heating to above the melting point of $LiNO_3$ (264° C.), cooling and then washing to remove the excess $LiNO_3$ and side-reaction product
2. Treating the Na-ion material with an aqueous solution of lithium salts, for example 1M LiCl in water; and
3. Treating the Na-ion material with a non-aqueous solution of lithium salts, for example LiBr in one or more aliphatic alcohols such as hexanol, propanol etc.

BRIEF DESCRIPTION OF THE DRAWINGS

The present invention will now be described with reference to the following figures in which.

DETAILED DESCRIPTION

Figure 1A:
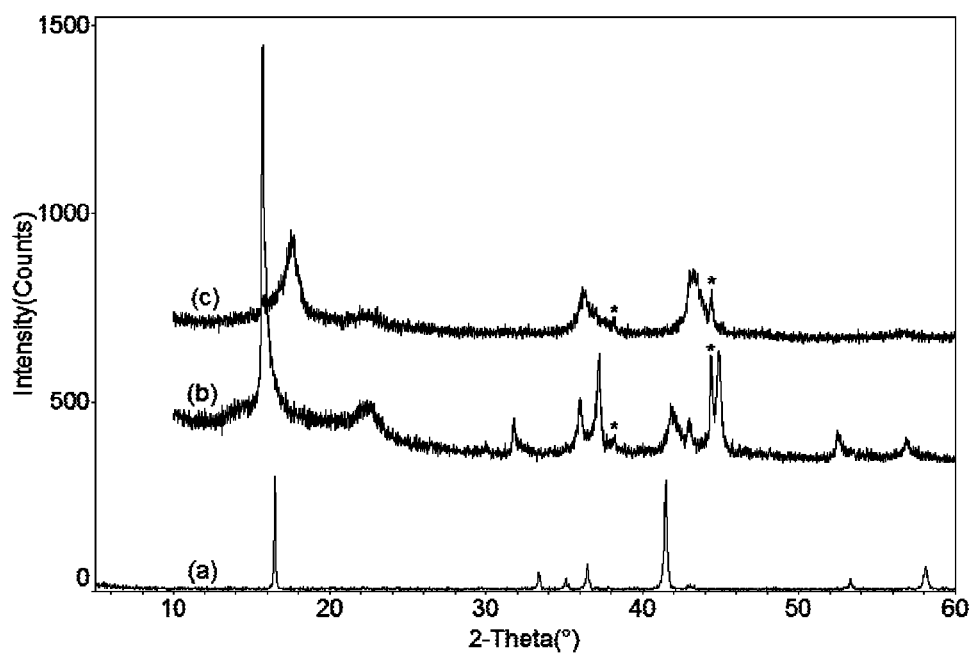
FIG. 1(A) is a comparison of XRD profiles for a) the precursor starting material, $NaNi_{0.25}Ti_{0.25}Mg_{0.25}Mn_{0.25}O_2$, b) an electrode, originally containing $NaNi_{0.25}Ti_{0.25}Mg_{0.25}Mn_{0.25}O_2$, recovered from a cell after charging to 120 mAh/g and c) an electrode, originally containing $NaNi_{0.25}Ti_{0.25}Mg_{0.25}Mn_{0.25}O_2$ recovered from a cell after charging to 230 mAh/g.

Any convenient process may be used to make the precursor materials (Formula 2) described above. For example, the following general method may be used:

General Method:
1) Intimately mix together the starting materials in the correct stoichiometric ratio and press into a pellet.
2) Heat the resulting mixture in a furnace using either an ambient air atmosphere, or a flowing inert atmosphere (e.g. argon or nitrogen), at a furnace temperature of between 400° C. and 1500° C. until reaction product forms.
3) Allow the product to cool before grinding it to a powder.

Table 1 below lists the starting materials and heating conditions used to prepare example precursor materials 1 to 12 of Formula 2.

TABLE 1

| PRECURSOR MATERIAL OF FORMULA 2 | STARTING MATERIALS | FURNACE CONDITIONS |
| --- | --- | --- |
| i $NaNi_{0.45}Mn_{0.45}Mg_{0.05}Ti_{0.05}O_2$ | $Na_2CO_3$<br>$NiCO_3$<br>$Mg(OH)_2$<br>$MnO_2$<br>$TiO_2$ | 1) Air/800° C., dwell time of 8 hours.<br>2) Air/900° C., dwell time of 8 hours. |

TABLE 1-continued

| | PRECURSOR MATERIAL OF FORMULA 2 | STARTING MATERIALS | FURNACE CONDITIONS |
|---|---|---|---|
| ii | $NaNi_{0.40}Mn_{0.40}Mg_{0.10}Ti_{0.10}O_2$ | $Na_2CO_3$<br>$NiCO_3$<br>$Mg(OH)_2$<br>$MnO_2$<br>$TiO_2$ | 1) Air/800° C., dwell time of 8 hours.<br>2) Air/900° C., dwell time of 8 hours. |
| iii | $NaNi_{0.35}Mn_{0.35}Mg_{0.15}Ti_{0.15}O_2$ | $Na_2CO_3$<br>$NiCO_3$<br>$MnO_2$<br>$Mg(OH)_2$<br>$TiO_2$ | 1) Air/900° C., dwell time of 8 hours.<br>2) Air/900° C., dwell time of 8 hours. |
| iv | $NaNi_{0.30}Mn_{0.30}Mg_{0.20}Ti_{0.20}O_2$ | $Na_2CO_3$<br>$NiCO_3$<br>$MnO_2$<br>$Mg(OH)_2$<br>$TiO_2$ | 1) Air/900° C., dwell time of 8 hours<br>2) Air/900° C., dwell time of 8 hours. |
| v | $NaNi_{0.40}Ti_{0.50}Mg_{0.10}O_2$ | $Na_2CO_2$<br>$NiCO_3$<br>$TiO_2$<br>$Mg(OH)_2$ | 1) Air/900° C., dwell time of 8 hours<br>2)/900° C., dwell time of 8 hours. |
| vi | $NaNi_{0.40}Ti_{0.40}Mg_{0.10}Mn_{0.10}O_2$ | $Na_2CO_3$<br>$NiCO_3$<br>$TiO_2$,<br>$Mg(OH)_2$<br>$MnO_2$ | 1) Air/900° C., dwell time of 8 hours<br>2) Air/900° C., dwell time of 8 hours. |
| vii | $NaNi_{0.40}Mn_{0.40}Mg_{0.05}Ti_{0.05}Al_{0.1}O_2$ | $Na_2CO_3$<br>$NiCO_3$<br>$Mg(OH)_2$<br>$MnO_2$<br>$TiO_2$<br>$Al(OH)_3$ | 1) Air/800° C., dwell time of 8 hours<br>2) Air/900° C., dwell time of 8 hours. |
| viii | $NaNi_{0.45}Mn_{0.45}Cu_{0.05}Ti_{0.05}O_2$ | $Na_2CO_3$<br>$NiCO_3$<br>$MnO_2$<br>$CuO$<br>$TiO_2$ | 1) Air/900° C., dwell time of 8 hours<br>2) Air/900° C., dwell time of 8 hours. |
| ix | $NaNi_{0.40}Mn_{0.40}Ca_{0.10}Ti_{0.10}O_2$ | $Na_2CO_3$<br>$NiCO_3$<br>$MnO_2$<br>$CaCO_3$<br>$TiO_2$ | 1) Air/900° C., dwell time of 8 hours<br>2) Air/900° C., dwell time of 8 hours.<br>3) Air/950° C., dwell time of 8 hours. |
| x | $NaNi_{0.40}Mn_{0.40}Zn_{0.10}Ti_{0.10}O_2$ | $Na_2CO_3$<br>$NiCO_3$<br>$MnO_2$<br>$CuO$<br>$TiO_2$ | 1) Air/900° C., dwell time of 8 hours<br>2) Air/900° C., dwell time of 8 hours. |
| xi | $NaNi_{25}Ti_{0.25}Mg_{0.25}Mn_{0.25}O_2$ | $Na_2CO_3$<br>$NiCO_3$<br>$TiO_2$<br>$Mg(OH)_2$<br>$MnO_2$ | 1) Air/900° C., dwell time of 8 hours<br>2) Air/950° C., dwell time of 8 hours |
| xii | $NaNi_{0.33}Mn_{0.33}Mg_{0.167}Ti_{0.167}O_2$ | $Na_2CO_3$<br>$NiCO_3$<br>$TiO_2$,<br>$Mg(OH)_2$<br>$MnO_2$ | 1) Air/900° C., dwell time of 8 hours |

Example 1

The Preparation of $Ni_{0.25}Ti_{0.25}Mg_{0.25}Mn_{0.25}O_{1.75}$

Active precursor doped nickelate material, $NaNi_{0.25}Ti_{0.2525}Mg_{0.25}Mn_{0.25}O_2$ (compound xi in Table 1), prepared using the general method described above, was made into a hard carbon anode/ $MaNi_{0.25}Ti_{0.25}Mg_{0.25}Mn_{0.25}O_2$ cathode cell using an electrolyte comprising 0.5M $NaClO_4$ in propylene carbonate, see FIG. 1(A)a. Following a charge process to 230 mAh/g, the cathode material was removed from the cell, washed several times in clean dimethyl carbonate and then dried at 70° C. Looking at FIG. 1(A)c, it is clear that the material obtained following the charge process to 230 mAh/g is not the same as that shown in either FIG. 1(A)b (charged to 120 mAh/g) or that shown by the original active precursor doped nickelate material, $NaNi_{0.25}Ti_{0.25}Mg_{0.25}Mn_{0.25}O_2$ (as shown in FIG. 1(A)a). The proposed composition for the product obtained following the charge process to 230 mAh/g is $Ni_{0.25}Ti_{0.25}Mg_{0.25}Mn_{0.25}O_{1.75}$, as determined by the following mass loss experiment.

Mass Loss Experiment to determine the composition of $Ni_{0.25}Ti_{0.25}Mg_{0.25}Mn_{0.25}O_{1.75}$.

Cathode material=$NaNi_{0.25}Ti_{0.25}Mg_{0.25}Mn_{0.25}O_2$

Anode=Hard Carbon

Electrolyte=0.5 M $NaClO_4$ in Propylene Carbonate.

Active Mass of cathode in as-prepared cell=21.5 mg

Following the charge process to 230 mAh/g, the cathode electrode disk was removed from the cell, washed several times in clean dimethyl carbonate to remove the electrolyte and then dried at 70° C.

Figure 1B:
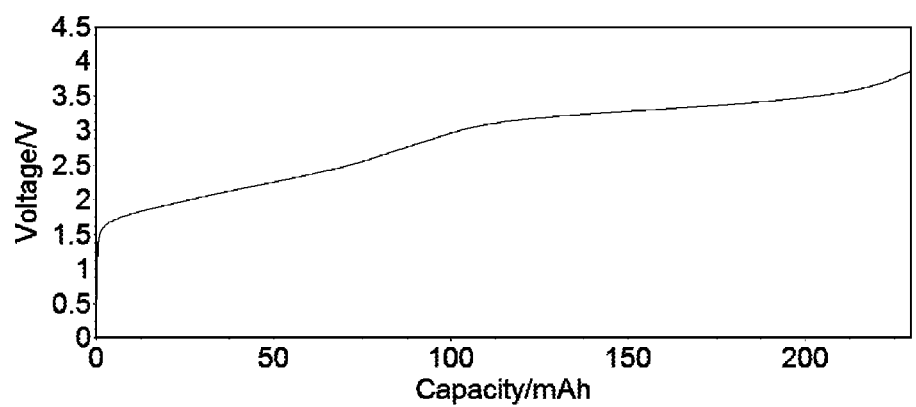
FIG. 1(B) shows the First Charge Process (Na-ion cell Voltage [V] versus Cathode Specific Charge Capacity [mAh/g]) for a Hard Carbon//$NaNi_{0.25}Ti_{0.25}Mg_{0.25}Mn_{0.25}O_2$ cell using an electrolyte of 0.5M sodium perchlorate in propylene carbonate (PC), charging to 230 mAh/g.

The Active Mass of the washed cathode after first charge process shown in FIG. 1(B)=16.1 mg Thus the Active Mass loss=(21.5 mg−16.1 mg)=5.4 mg which equates to:
% mass loss=25.1%

If charge process was just by Na-ion extraction then mass loss should be:
Starting composition=$NaNi_{0.25}Ti_{0.25}Mg_{0.25}Mn_{0.25}O_2$
Molecular weight=101.4 g/mol Based on only the $Ni^{2+}$ to $Ni^{4+}$ redox process, on cell charge it is only possible to extract 0.5 Na-ion per formula unit. i.e.

$$NaNi_{0.25}Ti_{0.25}Mg_{0.25}Mn_{0.25}O_2 \rightarrow Na_{0.5}Ni_{0.25}Ti_{0.25}Mg_{0.25}Mn_{0.25}O_2 + 0.5\ Na^+ + 0.5\ e^- \quad (1)$$

Therefore, the theoretical capacity based on this reaction (1) may be given by the following:

Theoretical Specific Capacity=(0.5×96485)/(101.4× 3.6)=132 mAh/g

Thus the Expected % Mass loss for reaction (1)=(11.5/101.4)×100=11.3%

The charge process as shown in FIG. 1(B), corresponds to an actual cathode specific capacity of 230 mAh/g—i.e. far in excess of the expected theoretical specific capacity of 132 mAh/g.

Thus the following overall charge mechanism is:

$$NaNi_{0.25}Ti_{0.25}Mg_{0.25}Mn_{0.25}O_2 \rightarrow Na_{0.5}Ni_{0.25}Ti_{0.25}Mg_{0.25}Mn_{0.25}O_2 + 0.5\ Na^+ + 0.5\ e^- \quad (1)$$

followed by:

$$Na_{0.5}Ni_{0.25}Ti_{0.25}Mg_{0.25}Mn_{0.25}O_2 \rightarrow Ni_{0.25}Ti_{0.25}Mg_{0.25}Mn_{0.25}O_{1.75} + 0.5\ Na^+ + 0.125\ O_2 + 0.5\ e^- \quad (2)$$

Looking at an overall process that relies on the complete extraction of Na:

$$NaNi_{0.25}Ti_{0.25}Mg_{0.25}Mn_{0.25}O_2 \rightarrow Ni_{0.25}Ti_{0.25}Mg_{0.25}Mn_{0.25}O_{1.75} + 1.0\ Na^+ + 0.125\ O_2 + 1.0\ e^- \quad (3)$$

The theoretical capacity based on this reaction (3) may be given by:

Theoretical Specific Capacity=(1.0×96485)/(101.4× 3.6)=264 mAh/g.

This compares well with the actual capacity achieved of 230 mAh/g.

Looking also at the Expected mass loss for reaction (3)=((101.4−74.4)/101.4)×100%=26.5%. Again this percentage mass loss is very close to the 25.1% which is observed.

Thus on the basis that there is close correspondence between theoretical and actual results for both Specific Capacity and Expected Mass Loss, the Applicant has been able to determine with a high degree of certainty that $Ni_{0.25}Ti_{0.25}Mg_{0.25}Mn_{0.25}O_{1.75}$ is obtained when $NaNi_{0.25}Ti_{0.2525}Mg_{0.25}Mn_{0.25}O_2$ is charged to the end of the second unconventional voltage plateau.

From reaction (3) above, it is proposed that the anomalous capacity arises as a result of the loss of $Na_2O$, i.e. the production of active Nations plus the liberation of $O_2$, and this produces a new layered oxide active material, $Ni_{0.25}Ti_{0.25}Mg_{0.25}Mn_{0.25}O_{1.75}$, as confirmed by comparing XRD FIG. 1Aa) with that of FIG. 1Ac). This is surprising because it is not the usual charging mechanism i.e. a simple $Na^+$ extraction from the cathode, but is a structural change that releases $Na^+$ and oxygen from the material to produce a new composition.

Example 2

The Preparation of $Na_aNi_{0.2535}Mn_{0.2535}Mg_{0.15}Ti_{0.15}O_{2-c}$

The data shown in FIGS. 2A, 2B, 2C and 2D are derived from the constant current cycling data for a $NaNi_{0.35}Mn_{0.35}Mg_{0.15}Ti_{0.15}O_2$ (compound iii in Table 1) active precursor cathode material in a Na-ion cell where this cathode material is coupled with a Hard Carbon (Carbotron P/J) anode material. The electrolyte used is a 0.5 M solution of $NaClO_4$ in propylene carbonate. The constant current data are collected at an approximate current density of 0.10 mA/cm² between voltage limits of 1.50 and 4.20 V. To fully charge the Na-ion cell it, is potentiostatically held at 4.2 V at the end of the constant current charging process. The testing is carried out at room temperature. During the cell charging process, sodium-ions are extracted from the cathode active material, and inserted into the Hard Carbon anode. During the subsequent discharge process, sodium-ions are extracted from the Hard Carbon and re-inserted into the cathode active material.

Figure 2A:
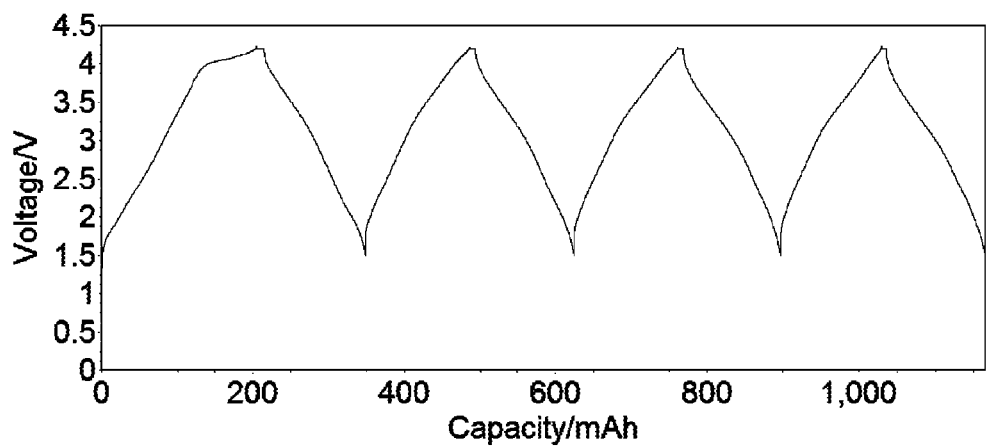
FIG. 2(A) shows the Charge-Discharge Voltage Profile for the first 4 cycles (Na-ion Cell Voltage [V] versus Cumulative Cathode Specific Capacity [mAh/g]) for a Hard Carbon//$NaNi_{0.35}Mn_{0.35}Mg_{0.15}Ti_{0.15}O_2$ cell, cycled between 1.5 to 4.2V.

FIG. 2A shows the first four charge-discharge cycles (Na-ion Cell Voltage [V] versus Cumulative Cathode Specific Capacity [mAh/g]) for the Hard Carbon//$NaNi_{0.35}Mn_{0.35}Mg_{0.15}Ti_{0.15}O_2$ cell. During the first charge process an anomalously high charge capacity is realized—a cathode specific capacity of 215 mAh/g is achieved this figure is significantly larger than the theoretical specific capacity (which amounts to 178 mAh/g, based on the $Ni^{2+}$ to $Ni^{4+}$ redox couple) for the $NaNi_{0.35}Mn_{0.35}Mg_{0.15}Ti_{0.15}O_2$ active material. In particular, a two section voltage profile is clearly evident during this initial cell charge step. At cell voltages lower than about 4.0 V a sloping profile is evident, presumably reflecting the conventional Na extraction process from the $NaNi_{0.35}Mn_{0.35}Mg_{0.15}Ti_{0.15}O_2$ precursor material. At cell voltages greater than about 4.0 V, a more flat voltage region is evident which presumably reflects a new Na extraction process (i.e. not based on the $Ni^{2+}$ to $Ni^{4+}$ redox couple) occurring for the $NaNi_{0.35}Mn_{0.35}Mg_{0.15}Ti_{0.15}O_2$ precursor material. The active material that produces the anomalously high specific capacity is understood to be $Na_aNi_{0.35}Mn_{0.35}Mg_{0.15}Ti_{0.15}O_{2-c}$. Importantly, as demonstrated below, this two section charge behaviour is not evident on subsequent cell charge profiles.

Figure 2B:
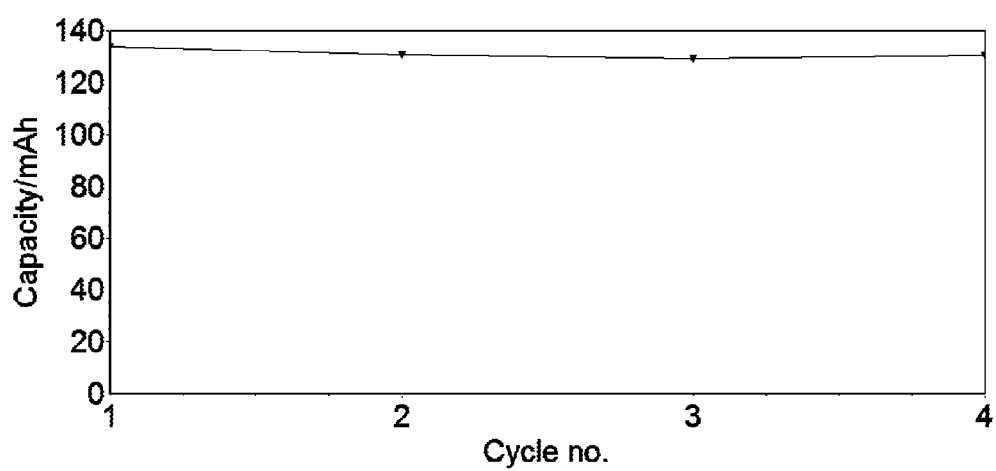
FIG. 2(B) shows the Cycle Life Performance (Cathode Specific Capacity [mAh/g] versus Cycle Number) for a Hard Carbon//$NaNi_{0.35}Mn_{0.35}Mg_{0.15}Ti_{0.15}O_2$ cell, cycled between 1.5 to 4.2V.

FIG. 2(B) shows the cycle life performance (Cathode Specific Capacity [mAh/g] versus Cycle Number) for a Hard Carbon//$NaNi_{0.35}Mn_{0.35}Mg_{0.15}Ti_{0.15}O_2$ cell. The cell shows good reversibility with the delivered cathode specific capacity reaching around 135 mAh/g after 4 cycles.

Figure 2C:
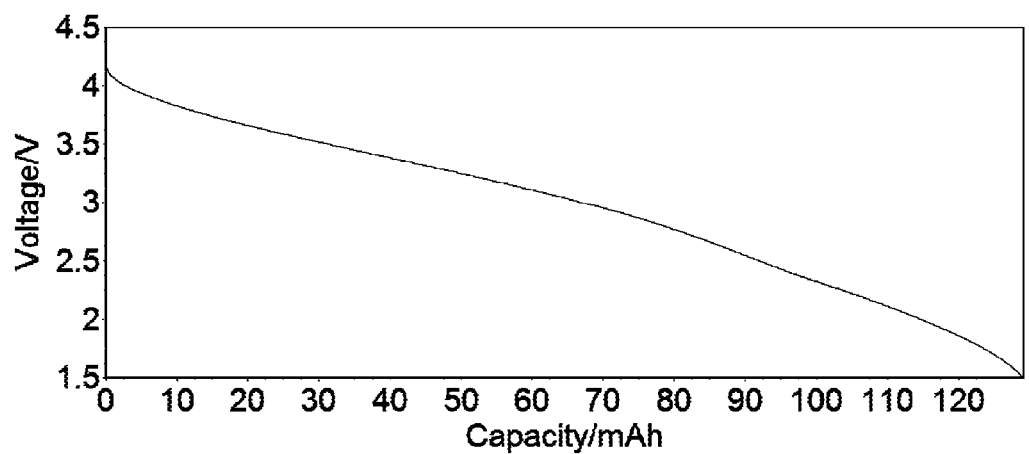
FIG. 2(C) shows the Third Cycle Discharge Voltage Profile (Na-ion Cell Voltage [V] versus Cathode Specific Capacity [mAh/g]) for a Hard Carbon//$NaNi_{0.35}Mn_{0.35}Mg_{0.15}Ti_{0.15}O_2$ cell, cycled between 1.5 to 4.2V.

FIG. 2(C) shows the third cycle discharge voltage profile (Na-ion Cell Voltage [V] versus Cathode Specific Capacity [mAh/g]) for the Hard Carbon//$NaNi_{0.35}Mn_{0.35}Mg_{0.15}Ti_{0.15}O_2$ cell. The cathode specific capacity in this cycle corresponds to 130 mAh/g.

Figure 2D:
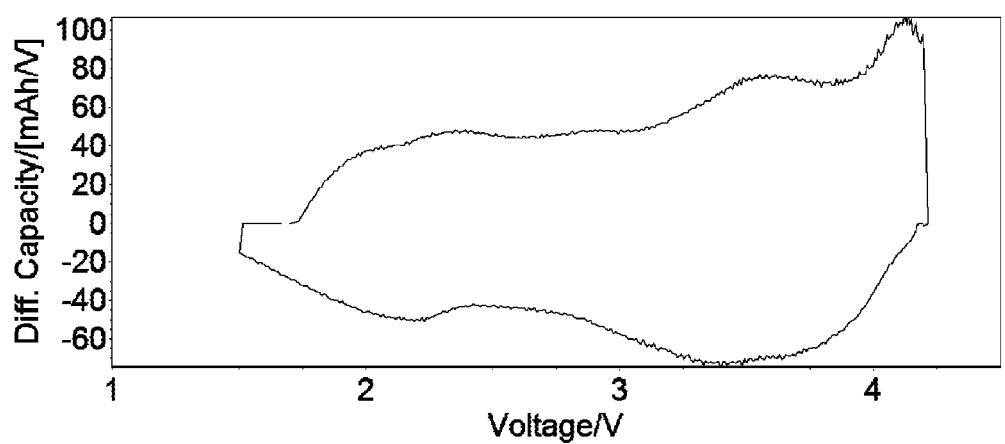
FIG. 2(D) shows the Third Cycle Differential Capacity Profiles (Differential Capacity [mAh/g/V]) versus Na-ion Cell voltage [V]) for a Hard Carbon//$NaNi_{0.35}Mn_{o35}Mg_{0.15}Ti_{0.15}O_2$ cell, cycled between 1.5 to 4.2V.

FIG. 2(D) shows the third cycle differential capacity profiles (Differential Capacity [mAh/g/V] versus Na-ion Cell Voltage [V]) for the Hard Carbon//$NaNi_{0.35}Mn_{0.35}Mg_{0.15}Ti_{0.15}O_2$ cell. These symmetrical data demonstrate the excellent reversibility of the ion-insertion reactions in this Na-ion cell.

Hard Carbon//NaNi$_{0.35}$Mn$_{0.35}$Mg$_{0.15}$Ti$_{0.15}$O$_2$ (Material=X0474A) Cell#204064

The data shown in FIGS. 3(A), 3(B), 3(C) and 3(D) are derived from the constant current cycling data for a NaNi$_{0.35}$Mn$_{0.35}$Mg$_{0.15}$Ti$_{0.15}$O$_2$ (compound iii in Table 1)) active precursor material in a Na-ion cell where this cathode material is coupled with a Hard Carbon (Carbotron P/J) anode material. The electrolyte used is a 0.5 M solution of NaClO$_4$ in propylene carbonate. The constant current data are collected at an approximate current density of 0.10 mA/cm$^2$ between voltage limits of 1.50 V and 4.40 V. To fully charge the cell the Na-ion cell is potentiostatically held at 4.4 V at the end of the constant current charging process. The testing is carried out at room temperature. During the cell charging process, sodium ions are extracted from the cathode active material, and inserted into the Hard Carbon anode. During the subsequent discharge process, sodium-ions are extracted from the Hard Carbon and re-inserted into the cathode active material.

Figure 3A:
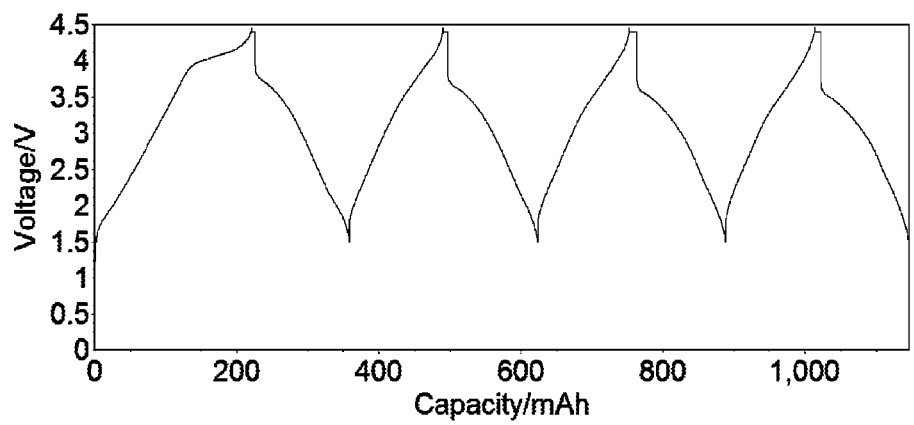
FIG. 3(A) shows the Charge-Discharge Voltage Profiles for the first 4 cycles (Na-ion cell Voltage [V] versus Cumulative Cathode Specific Capacity [mAh/g]) for a Hard Carbon//$NaNi_{0.35}Mn_{0.35}Mg_{0.15}Ti_{0.15}O_2$ cell, cycled between 1.5 to 4.4V.

FIG. 3(A) shows the first four charge-discharge cycles (Na-ion Cell Voltage [V] versus Cumulative Cathode Specific Capacity [mAh/g]) for the Hard Carbon// NaNi$_{0.35}$Mn$_{0.35}$Mg$_{0.15}$Ti$_{0.15}$O$_2$ cell (Cell#204064). During the first charge process an anomalously high charge capacity is realized—a cathode specific capacity of 226 mAh/g is achieved a figure which is significantly larger than the theoretical specific capacity (which amounts to 178 mAh/g, based on the Ni$^{2+}$ to Ni$^{4+}$ redox couple) for the NaNi$_{0.35}$Mn$_{0.35}$Mg$_{0.15}$Ti$_{0.15}$O$_2$ active material. In particular, a two section voltage profile is clearly evident during this initial cell charge step. At cell voltages lower than about 4.0 V a sloping profile is evident, presumably reflecting the conventional Na extraction process from the NaNi$_{0.35}$Mn$_{0.35}$Mg$_{0.15}$Ti$_{0.15}$O$_2$ active material. At cell voltages greater than about 4.0 V, a more flat voltage region is evident which presumably reflects a new Na extraction process (i.e. not based on the Ni$^{2+}$ to Ni$^{4+}$ redox couple) occurring for the NaNi$_{0.35}$Mn$_{0.35}$Mg$_{0.15}$Ti$_{0.15}$O$_2$ active precursor material. Importantly, this two section charge behaviour is not evident on subsequent cell charge profiles.

Figure 3B:
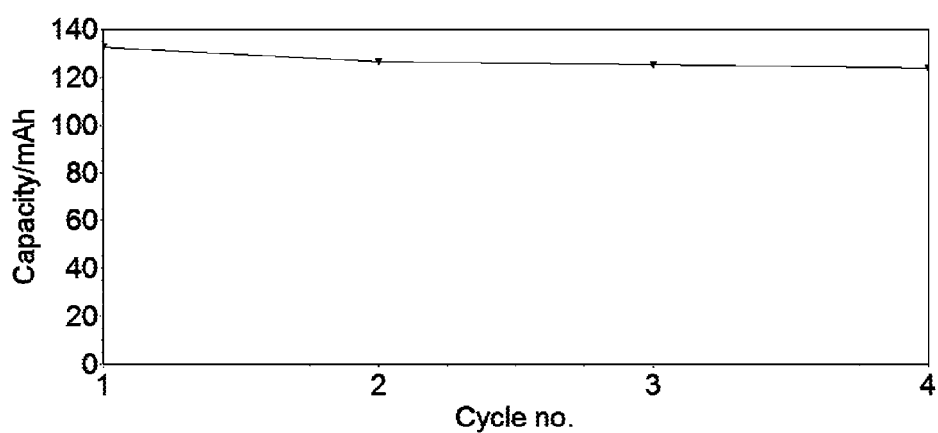
FIG. 3(B) shows the Cycle Life Performance (Cathode Specific Capacity [mAh/g] versus Cycle Number) for a Hard Carbon//$NaNi_{0.35}Mn_{0.35}Mg_{0.15}Ti_{0.15}O_2$ cell, cycled between 1.5 to 4.4V.

FIG. 3(B) shows the cycle life performance (Cathode Specific Capacity [mAh/g] versus Cycle Number) for the Hard Carbon//NaNi$_{0.35}$Mn$_{0.35}$Mg$_{0.15}$Ti$_{0.15}$O$_2$ cell. The cell shows good reversibility with the delivered cathode specific capacity reaching around 130 mAh/g after 4 cycles.

Figure 3C:
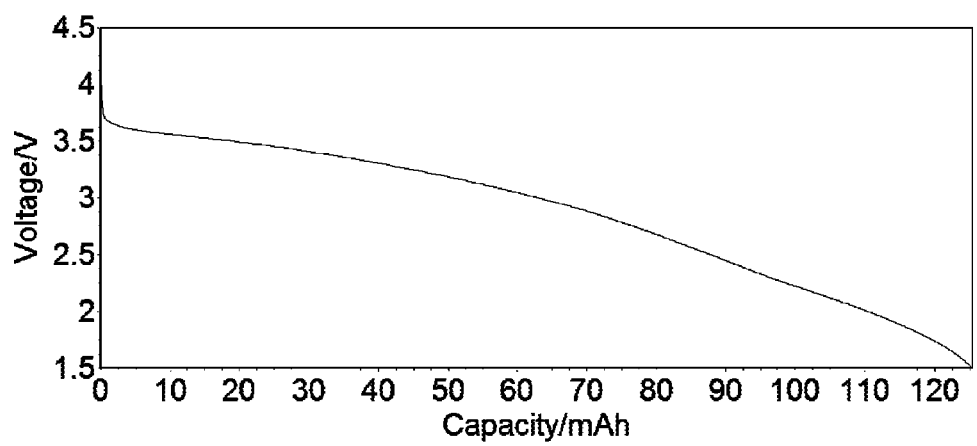
FIG. 3(C) shows the Third Cycle Discharge Voltage Profile (Na-ion Cell Voltage [V] versus Cathode Specific Capacity [mAh/g]) for a Hard Carbon//$NaNi_{0.35}Mn_{0.35}Mg_{0.15}Ti_{0.15}O_2$ cell, cycled between 1.5 to 4.4V.

FIG. 3(C) shows the third cycle discharge voltage profile (Na-ion Cell Voltage [V] versus Cathode Specific Capacity [mAh/g]) for the Hard Carbon// NaNi$_{0.35}$Mn$_{0.35}$Mg$_{0.15}$Ti$_{0.15}$O$_2$ cell. The cathode specific capacity in this cycle corresponds to 125 mAh/g.

Figure 3D:
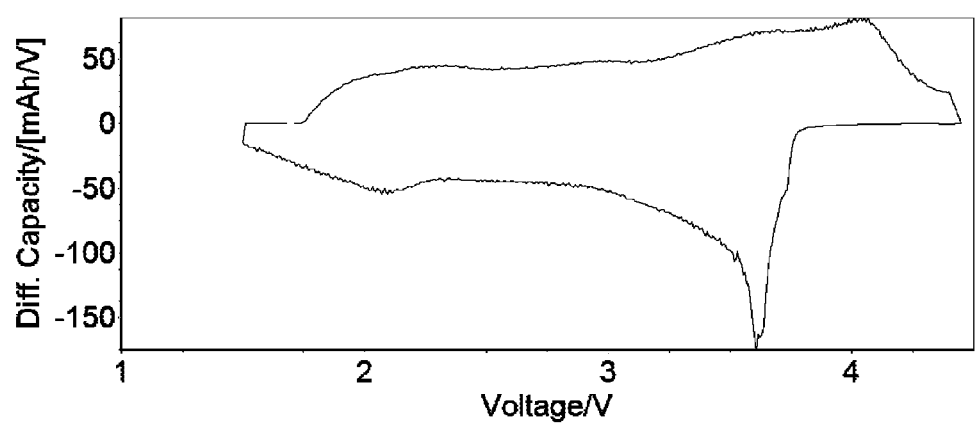
FIG. 3(D) shows the Third Cycle Differential Capacity Profiles (Differential Capacity [mAh/g/V]) versus Na-ion Cell voltage [V]) for a Hard Carbon//$NaNi_{0.35}Mn_{0.35}Mg_{0.15}Ti_{0.15}O_2$ cell, cycled between 1.5 to 4.4V.

FIG. 3(D) shows the third cycle differential capacity profiles (Differential Capacity [mAh/g/V] versus Na-ion Cell Voltage [V]) for the Hard Carbon// NaNi$_{0.35}$Mn$_{0.35}$Mg$_{0.15}$Ti$_{0.15}$O$_2$ cell. These symmetrical data demonstrate the excellent reversibility of the ion-insertion reactions in this Na-ion cell.

Other sodium doped nickelate electrode materials were also found to exhibit anomalous charge capacities:

TABLE 2

| Precursor [Formula 2] | Product [Formula 1] | Theoretical Charge Capacity based on Ni$^{2+}$/Ni$^{4+}$ only [mAh/g] | Theoretical Charge Capacity based on removal of all Na [mAh/g] | Actual Charge Capacity [mAh/g] |
|---|---|---|---|---|
| Example 3. NaNi$_{0.33}$Mn$_{0.33}$Mg$_{0.167}$Ti$_{0.167}$O$_2$ | Ni$_{0.33}$Mn$_{0.33}$Mg$_{0.167}$Ti$_{0.167}$O$_{1.833}$ | 169 | 256 | 239 |
| Example 4. NaNi$_{0.33}$Mn$_{0.33}$Cu$_{0.167}$Ti$_{0.167}$O$_2$ | Ni$_{0.33}$Mn$_{0.33}$Cu$_{0.167}$Ti$_{0.167}$O$_{1.833}$ | 159 | 241 | 221 |

It is desirable for electrode materials to be safe during charge and discharge in an energy storage device. Li-ion batteries in common use today undergo safety/abuse testing, the results of such tests revealing that lithium oxide-based cathode materials are liable to liberate oxygen, which is a major contributing factor to an undesirable process known as thermal runaway. Prior to the present invention it might have been expected that a similar thermal runaway process would also be observed for sodium oxide-based materials, and that such sodium oxide-based materials would be unsafe and/or rendered completely useless by overcharging in rechargeable battery applications. However, the present invention has surprisingly demonstrated that when these sodium-based materials are overcharged, the 'labile' oxygen (which could contribute to thermal runaway) is caused to be removed from the structure; this yields the materials of the present invention which are highly thermodynamically stable and which are extremely effective and safe when used in reversible cathode materials.

Product Analysis using XRD

Analysis by X-ray diffraction techniques was conducted using a Siemens D5000 powder diffractometer to confirm that the desired target materials had been prepared, to establish the phase purity of the product material and to determine the types of impurities present. From this information it is possible to determine the unit cell lattice parameters.

The XRD operating conditions used to analyse the precursor electrode materials are as follows:

Slits sizes: 1 mm, 1 mm, 0.1 mm
Range: 2θ=5 °–60 °
X-ray Wavelength=1.5418 Å (Angstoms) (Cu Kα)
Speed: 1.0 seconds/step
Increment: 0.025 °

The XRD operating conditions used for ex-situ analysis of the electrodes are as follows:

Slits sizes: 1 mm, 1 mm, 0.1 mm
Range: 2θ=10 °–60 °
X-ray Wavelength=1.5418 Å (Angstoms) (Cu Kα)
Speed: 8.0 seconds/step
Increment: 0.015 °

Electrochemical Results

The target materials were tested either i) using a lithium metal anode test cell, or ii) using a Na-ion test cell using a hard carbon anode. It is also possible to test using a Li-ion cell with a graphite anode. Cells may be made using the following procedures:

Generic Procedure to Make a Lithium Metal Electrochemical Test Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode. Metallic lithium on a copper current collector may be employed as the negative electrode. The electrolyte comprises one of the following: (i) a 1 M solution of $LiPF_6$ in ethylene carbonate (EC) and dimethyl carbonate (DMC) in a weight ratio of 1:1; (ii) a 1 M solution of $LiPF_6$ in ethylene carbonate (EC) and diethyl carbonate (DEC) in a weight ratio of 1:1; or (iii) a 1 M solution of $LiPF_6$ in propylene carbonate (PC) A glass fibre separator (Whatman, GF/A) or a porous polypropylene separator (e.g. Celgard 2400) wetted by the electrolyte is interposed between the positive and negative electrodes.

A Na-ion electrochemical test cell containing the active material is constructed as follows:

Generic Procedure to Make a Hard Carbon Na-ion Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode.

The negative electrode is prepared by solvent-casting a slurry of the hard carbon active material (Carbotron P/J, supplied by Kureha), conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 84% active material, 4% Super P carbon, and 12% Kynar 2801 binder. Optionally, a copper current collector may be used to contact the negative electrode.

Generic Procedure to Make a Graphite Li-Ion Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode.

The negative electrode is prepared by solvent-casting a slurry of the graphite active material (Crystalline Graphite, supplied by Conoco Inc.), conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 92% active material, 2% Super P carbon, and 6% Kynar 2801 binder. Optionally, a copper current collector may be used to contact the negative electrode.

Cell Testing

The cells are tested as follows, using Constant Current Cycling techniques.

The cell is cycled at a given current density between pre-set voltage limits. A commercial battery cycler from Maccor Inc. (Tulsa, Okla., USA) is used. On charge, sodium (lithium)-ions are extracted from the cathode active material. During discharge, sodium (lithium)-ions are re-inserted into the cathode active material.

Cell Parameters at Various States of Charge of an Electrode Originally Containing $NaNi_{0.25}Ti_{0.25}Mg_{0.25}Mn_{0.25}O_2$ (Precursor Material xiii)

Although the materials may change structure upon charge, for the purposes of calculating the cell parameters given in Table 2, an R-3m space group was used for the calculation at all states of charge.

TABLE 2

Calculated cell parameters for $NaNi_{0.25}Ti_{0.25}Mg_{0.25}Mn_{0.25}O_2$ at different states of charge (standard deviation shown in brackets)

| | a (Å) | c (Å) | Vol (Å$^3$) |
|---|---|---|---|
| Uncharged | 2.9839(2) | 16.076(2) | 143.135 |
| 120 mAh/g | 2.9149(5) | 16.852(7) | 143.185 |
| 230 mAh/g | 2.873(1) | 14.82(1) | 122.326 |

As the pristine material is charged to 120 mAh/g, nickel reduces in size as it is oxidised from $Ni^{2+}$ (IR for CN 6=0.69 Å) to $Ni^{4+}$ (IR for CN 6=0.48 Å), and this is reflected in the α-parameter. The c-parameter, however, increases upon charging to 120 mAh/g, and this is due to an increase in repulsion between the electronegative oxygen-ions of adjacent layers, as the sodium-ions are removed.

Upon further charging of this electrode, to 230 mAh/g, there is negligible further oxidation of the nickel, so the nickel oxidation state no longer contributes to the volume change of the unit cell. The Applicant does not wish to be rigidly bound to the following explanation but it is their current belief that the further application of an oxidative potential is capable of oxidising $O^{2-}$ in the lattice, thus releasing this from the structure as $O_2$, and this is accompanied by a removal of the remaining sodium-ions. The loss of both sodium and oxygen in this way appears to explain the observed reduction in both the a- and c-parameters, and the resulting overall reduction in unit cell volume.

Figure 4A:
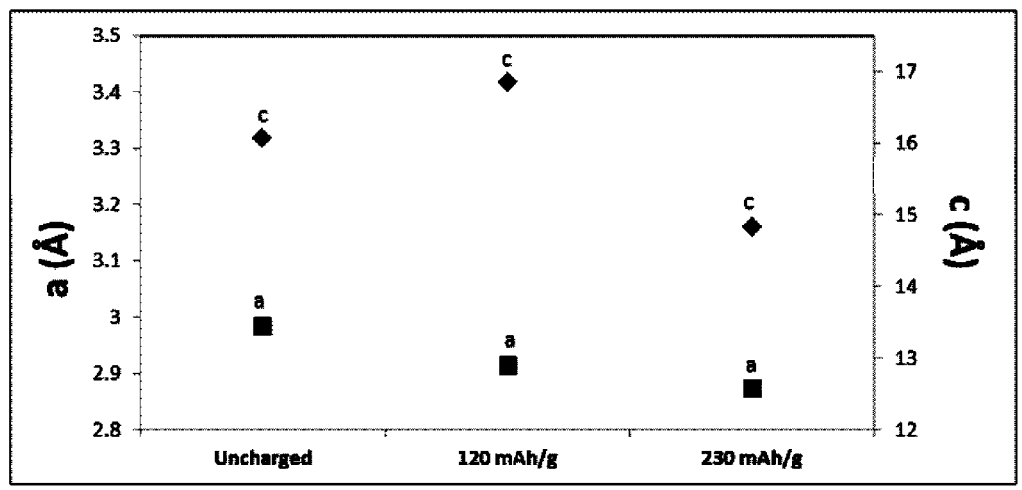
FIG. 4(A) shows the changes observed in the a and c cell parameters for $NaNi_{25}Ti_{0.25}Mg_{0.25}Mn_{0.25}O_2$ as pristine material, material charged to 120 mAh/g and material charged to 230 mAh/g.
Figure 4B:
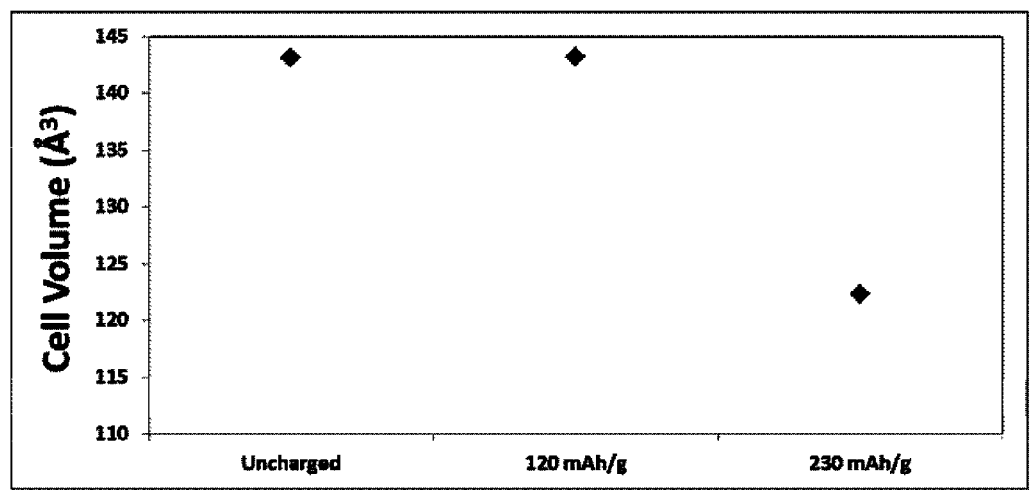
FIG. 4(B) shows the changes in unit cell volume for $NaNi_{25}Ti_{0.25}Mg_{0.25}Mn_{0.25}O_2$ as pristine material, material charged to 120 mAh/g and material charged to 230 mAh/g.

These results are shown in FIGS. 4(A) and 4(B).

The invention claimed is:

1. A compound comprising:

$$A_aM^1_vM^2_wM^3_xM^4_yM^5_zO_{2-c} \quad \text{(Formula 1)}$$

wherein
A comprises sodium;
$M^1$ is nickel in oxidation state greater than 0 to less than or equal to 4+,
$M^2$ comprises a metal in oxidation state greater than 0 to less than or equal to 4+,
$M^3$ comprises a metal in oxidation state 2+,
$M^4$ comprises a metal in oxidation state greater than 0 to less than or equal to 4+, and
$M^5$ comprises a metal in oxidation state 3+
wherein
$0 \leq a \leq 1$
$v > 0$
at least one of w and y is >0
wherein one of x and z is ≥0, and the other of x and z is >0;
$c > 0.1$
where (a, v, w, x, y, z and c) are chosen to maintain electroneutrality.

2. The compound according to claim 1, comprising:

$$A_aM^1_vM^2_wM^3_xM^4_yM^5_zO_{2-c} \quad \text{(Formula 1)}$$

wherein
A comprises sodium;
$M^1$ is nickel in oxidation state 4+,
$M^2$ comprises a metal in oxidation state 4+,
$M^3$ comprises a metal in oxidation state 2+,
$M^4$ comprises a metal in oxidation state 4+, and
$M^5$ comprises a metal in oxidation state 3+.

3. The compound according to claim 1 comprising:

$$A_aM^1_vM^2_wM^3_xM^4_yM^5_zO_{2-c} \quad \text{(Formula 1)}$$

wherein
$0 < v < 0.5$;
$0 < w \leq 0.5$;
$0 \leq x < 0.5$;
$0 < y < 0.5$;
$c \geq 0.11$.

4. The compound according to claim 1 wherein $M^2$ comprises a metal selected from one or more of manganese, titanium and zirconium; $M^3$ comprises a metal selected from one or more of magnesium, calcium, copper, zinc and cobalt; $M^4$ comprises a metal selected from one or more of manganese, titanium and zirconium; and $M^5$ comprises a metal selected from one or more of aluminium, iron, cobalt, molybdenum, chromium, vanadium, scandium and yttrium.

5. An electrode comprising the compound according to claim 1.

6. An energy storage device comprising the compound according to claim 1.

7. A rechargeable battery comprising the electrode according to claim 5.

8. An electrochemical device comprising the electrode according to claim 5.

9. An electrochromic device comprising the electrode according to claim 5.

10. The electrode according to claim 5 used in conjunction with a counter electrode and one or more electrolyte materials.

11. The electrode according to claim 10 wherein the electrolyte material comprises an aqueous electrolyte material.

12. The electrode according to claim 10 wherein the electrolyte material comprises a non-aqueous electrolyte material.

13. A method of optimizing the specific charge capacity of an oxide-containing cathode compound according to claim 1 in a sodium-ion cell comprising:
a) forming a sodium-ion cell comprising an oxide-containing cathode compound having the formula:

$$A'_{a'}M^{1'}_{v'}M^{2'}_{w'}M^{3'}_{x'}M^{4'}_{y'}M^{5'}_{z'}O_2 \quad \text{(Formula 2)}$$

wherein
A' comprises sodium;
$M^{1'}$ is nickel in oxidation state 2+,
$M^{2'}$ comprises a metal in oxidation state 4+,
$M^{3'}$ comprises a metal in oxidation state 2+,
$M^{4'}$ comprises a metal in oxidation state 4+, and
$M^{5'}$ comprises a metal in oxidation state 3+
$1 \leq a' < 2$;
$0 < v' < 0.5$;
$0 < w' \leq 0.5$;
$0 \leq x' < 0.5$;
$0 \leq y' < 0.5$;
$z' \geq 0$;
wherein one of x and z is ≥0, and the other of x and z is >0;
and wherein v', w', x', y' and z' are all chosen to maintain electroneutrality
b) optionally charging said cell to a cell voltage within the conventional theoretical capacity based on the $Ni^{2+}/Ni^{4+}$ redox couple;
c) charging said cell to a cell voltage that results in the active cathode material being charged beyond its conventional theoretical capacity based on the $Ni^{2+}/Ni^{4+}$ redox couple; and
d) degassing the resulting Na-ion cell to remove gasses formed during the charging process.

14. A method of using an oxide-containing cathode compound of claim 1 in a Na-ion cell comprising:
a) forming a Na-ion cell comprising an active oxide-containing cathode material having the formula:

$$A'_{a'}M^{1'}_{v'}M^{2'}_{w'}M^{3'}_{x'}M^{4'}_{y'}M^{5'}_{z'}O_2 \quad \text{(Formula 2)}$$

wherein
A' comprises sodium;
$M^{1'}$ is nickel in oxidation state 2+,
$M^{2'}$ comprises a metal in oxidation state 4+,
$M^{3'}$ comprises a metal in oxidation state 2+,
$M^{4'}$ comprises a metal in oxidation state 4+, and
$M^{5'}$ comprises a metal in oxidation state 3+
$1 \leq a' < 2$;
$0 < v' < 0.5$;
$0 < w' \leq 0.5$;
$0 \leq x' < 0.5$;
$0 \leq y' < 0.5$;
$z' \geq 0$;
wherein one of x and z is ≥0, and the other of x and z is ≤0;
and wherein v', w', x', y' and z' are all choses to maintain electroneutrality
b) optionally charging said cell to a cell voltage within the conventional theoretical capacity based on the $Ni^{2+}/Ni^{4+}$ redox couple;
c) charging said Na-ion cell to a cell voltage that results in the active oxide-containing cathode material of Formula 2 being charged beyond its conventional theoretical capacity based on the $Ni^{2+}/Ni^{4+}$ redox couple;

d) degassing the resulting Na-ion cell to remove gasses formed during the charging process; and e) cycling the Na-ion cell from step b) at a voltage within the normal voltage limits based on the $Ni^{2+}/Ni^{4+}$ redox couple.

15. A method of using an oxide-containing cathode compound of claim 1 in a Na-ion cell comprising the steps of:
   a) forming a Na-ion cell comprising the oxide-containing cathode compound of Formula 1; and
   b) cycling the Na-ion cell from step a) at a voltage within the normal voltage limits based on the $Ni^{2+}/Ni^{4+}$ redox couple.

16. The compound according to claim 1 comprising: $Na_{0.2}Ni_{0.25}Ti_{0.25}Mg_{0.25}Mn_{0.25}O_{1.85}$.

17. A compound comprising:

$$A_a M^1_v M^2_w M^3_x M^4_y M^5_z O_{2-c} \qquad \text{(Formula 1)}$$

wherein
A comprises sodium;
$M^1$ is nickel is oxidation state equal to 4+,
$M^2$ comprises a metal in oxidation state equal to 4+,
$M^3$ comprises a metal in oxidation state 2+,
$M^4$ comprises a metal in oxidation state equal to 4+, and
$M^5$ comprises a metal in oxidation state 3+
wherein
a=0
v>0
at least one of w and y is >0
wherein one of x and z is ≥0, and the other x and z is >0;
0.1<c≤0.5
where (a, v, w, x, y, z, and c) are choses to maintain electroneutrality.

18. The compound according to claim 17 comprising: $Ni_{0.33}Mn_{0.33}M^3{}_{0.167}Ti_{0.167}O_{1.83}$.

19. The compound according to claim 17 comprising one or more of:
$Ni_{0.25}Ti_{0.25}Mg_{0.25}Mn_{0.25}O_{1.75}$;
$Ni_{0.33}Mn_{0.33}Mg_{0.167}Ti_{0.167}O_{1.83}$;
$Ni_{0.33}Mn_{0.33}Cu_{0.167}Ti_{0.167}O_{1.83}$;
$Ni_{0.33}Mn_{0.33}Zn_{0.167}Ti_{0.167}O_{1.83}$;
$Ni_{0.33}Mn_{0.33}Ca_{0.167}Ti_{0.167}O_{1.83}$;
$Ni_{0.35}Mn_{0.35}Mg_{0.15}Ti_{0.15}O_{1.85}$;
$Ni_{0.3}Mn_{0.3}Mg_{0.2}Ti_{0.2}O_{1.8}$;
$Ni_{0.35}Mn_{0.35}Mg_{0.05}Ti_{0.05}Al_{0.2}O_{1.85}$;
$Ni_{0.33}Mn_{0.33}Mg_{0.11}Ti_{0.11}Al_{0.11}O_{1.83}$;
$Ni_{0.3}Mn_{0.3}Mg_{0.05}Ti_{0.05}Al_{0.3}O_{1.8}$;
$Ni_{0.35}Mn_{0.35}Mg_{0.1}Ti_{0.1}Al_{0.1}O_{1.85}$;
$Ni_{0.3}Mn_{0.3}Mg_{0.1}Ti_{0.1}Al_{0.2}O_{1.8}$;
$Ni_{0.33}Mn_{0.33}Al_{0.33}O_{1.83}$;
$Ni_{0.35}Mg_{0.15}Mn_{0.5}O_{1.85}$;
$Ni_{0.33}Mg_{0.167}Mn_{0.5}O_{1.83}$;
$Ni_{0.3}Mg_{0.2}Mn_{0.5}O_{1.8}$;
$Ni_{0.35}Mg_{0.15}Mn_{0.5}O_{1.85}$;
$Ni_{0.3}Mg_{0.2}Mn_{0.5}O_{1.8}$.

20. A method of producing a compound of:

$$A_a M^1_v M^2_w M^3_x M^4_y M^5_z O_{2-c} \qquad \text{(Formula 1)}$$

comprising the step of charging an electrochemical cell containing one or more active cathode materials of Formula 2 beyond the conventional theoretical specific capacity as determined by the $Ni^{2+}/Ni^{4+}$ redox couple; wherein Formula 2 is defined as:

$$A'_{a'} M^{1'}_{v'} M^{2'}_{w'} M^{3'}_{x'} M^{4'}_{y'} M^{5'}_{z'} O_2 \qquad \text{(Formula 2)}$$

wherein
A' comprises sodium;
$M^{1'}$ is nickel in oxidation state 2+,
$M^{2'}$ comprises a metal in oxidation state 4+,
$M^{3'}$ comprises a metal in oxidation state 2+,
$M^{4'}$ comprises a metal in oxidation state 4+, and
$M^{5'}$ comprises a metal in oxidation state 3+
1≤a'<2;
0<v'<0.5;
0<w'≤0.5;
0≤x'<0.5;
0≤y'<0.5;
z'≥0;
wherein on of x and z is ≥0, and the other of x and z is >0;
and wherein v', w', x', y' and z' are all chosen to maintain electroneutrality.

21. A method of producing a compound of:

$$A_a M^1_v M^2_w M^3_x M^4_y M^5_z O_{2-c} \qquad \text{(Formula 1)}$$

comprising the step of causing a net loss of $Na_2O$ from one or more active cathode materials of Formula 2; wherein Formula 2 is defined as:

$$A'_{a'} M^{1'}_{v'} M^{2'}_{w'} M^{3'}_{x'} M^{4'}_{y'} M^{5'}_{z'} O_2 \qquad \text{(Formula 2)}$$

wherein
A' comprises sodium;
$M^{1'}$ is nickel in oxidation state 2+,
$M^{2'}$ comprises a metal in oxidation state 4+,
$M^{3'}$ comprises a metal in oxidation state 2+,
$M^{4'}$ comprises a metal in oxidation state 4+, and
$M^{5'}$ comprises a metal in oxidation state 3+
1≤a'<2;
0<v'<0.5;
0<w'≤0.5;
0≤x'<0.5;
0≤y'<0.5;
z'≥0;
wherein one of x and z is ≥0, and the other of x and z is >0;
and wherein v', w', x', y' and z' are all chosen to maintain electroneutrality.

22. A method of making an oxygen deficient oxide-containing cathode compound for use in a Na-ion cell comprising:
   a) forming an electrochemical cell comprising an oxide-containing cathode compound;
   b) charging the oxide-containing cathode compound in said electrochemical cell to cause the loss of oxygen from the oxide-containing cathode compound and thereby form the oxygen deficient oxide-containing cathode compound.

23. The method according to claim 22 comprising charging the Na-ion cell until the oxide-containing cathode compound loses sodium ions.

* * * * *

UNITED STATES PATENT AND TRADEMARK OFFICE
CERTIFICATE OF CORRECTION

PATENT NO. : 9,917,307 B2  
APPLICATION NO. : 14/430000  
DATED : March 13, 2018  
INVENTOR(S) : Jeremy Barker Page 1 of 1

It is certified that error appears in the above-identified patent and that said Letters Patent is hereby corrected as shown below:

In the Claims

Column 19, Claim 1, Line 16 should read:
$0 < a \leq 1$

Signed and Sealed this  
Twelfth Day of June, 2018

Andrei Iancu  
*Director of the United States Patent and Trademark Office*